United States Patent [19]

Suzuki et al.

[11] Patent Number: 5,714,204
[45] Date of Patent: Feb. 3, 1998

[54] ANTI-DUSTING TREATING METHOD AND TREATING AGENT FOR INORGANIC FIBER CONTAINING BUILDING MATERIAL

[75] Inventors: Nobuo Suzuki; Takao Takeshi; Toshio Kumagai, all of Tokyo, Japan

[73] Assignee: Shimizu Construction Co., Ltd., Tokyo, Japan

[21] Appl. No.: 74,014

[22] Filed: Jun. 9, 1993

Related U.S. Application Data

[63] Continuation of Ser. No. 825,734, Jan. 27, 1992, abandoned, which is a continuation of Ser. No. 228,625, Aug. 5, 1988, abandoned.

[30] Foreign Application Priority Data

Aug. 6, 1987 [JP] Japan .................................. 62-195274
Dec. 25, 1987 [JP] Japan .................................. 62-327162

[51] Int. Cl.$^6$ .......................... B05D 1/02; B05D 3/00
[52] U.S. Cl. .................... 427/401; 52/741.1; 427/421
[58] Field of Search ................ 52/741.1; 427/401, 427/421

[56] References Cited

U.S. PATENT DOCUMENTS 3,865,683  2/1975  Schnee et al. .................... 161/205
3,967,006  6/1976  Yamaguchi et al. ............... 427/221
3,967,043  6/1976  Otouma et al. ................... 428/443

*Primary Examiner*—Michael Lusignan
*Attorney, Agent, or Firm*—Armstrong, Westerman, Hattori, McLeland & Naughton

[57] ABSTRACT

The present invention relates to an anti-dusting treating method and treating agent for inorganic fiber containing building materials which comprises impregnating an inorganic fiber containing building material with an aqueous solution of either a polyvinyl alcohol or a denatured polyvinyl alcohol.

The present invention aims at preventing dusting of a building material containing an inorganic fiber such as asbestos by impregnating such an inorganic fiber containing building material with a polyvinyl alcohol or denatured polyvinyl alcohol aqueous solution. The polyvinyl alcohol or denatured polyvinyl alcohol employed in the present invention has excellent penetrating and film-forming properties, and the impregnated polyvinyl alcohol or denatured polyvinyl alcohol serves as an adhesive by which inorganic fibers such as asbestos fibers are fixed. Therefore, it is possible to facilitate the impregnating operation and obtain satisfactory anti-dusting effectiveness.

11 Claims, 3 Drawing Sheets

FIG.3

ORIFICE 3

NEEDLE TUBE 2

PIPE 1

PUMP 4

PVA AQUEOUS SOLUTION
OR DENATURED PVA AQUEOUS SOLUTION

SPRAYED ASBESTOS CONTAINING MATERIAL 5

ANTI-DUSTING TREATING METHOD AND TREATING AGENT FOR INORGANIC FIBER CONTAINING BUILDING MATERIAL

BACKGROUND OF THE INVENTION

This application is a continuation of application Ser. No. 07/825,734 filed Jan. 27, 1992, now abandoned, which is a continuation of Ser. No. 07/228,625, filed Aug. 5, 1988 now abandoned.

The present invention relates to an anti-dusting treating method and treating agent for inorganic fiber containing building materials. More specifically, the present invention pertains to a treating method wherein a building material that contains an inorganic fiber, for example, asbestos, is impregnated with an aqueous solution of either a polyvinyl alcohol of a denatured polyvinyl alcohol to prevent dusting and hence scattering of asbestos from the building material. The present invention is also concerned with an anti-dusting treating agent for inorganic fiber containing building materials.

One type of building material that is used to form side walls, ceiling, etc. contains inorganic fibers such as asbestos. Asbestos or other inorganic fibers contained in such building materials gradually dust and scatter in the air in existing old concrete buildings, houses and the like, and this scattering of asbestos or other inorganic fibers has been a problem these days.

In particular, there have already been developed and used many heat insulating and acoustical building materials that contain asbestos. If asbestos contained in these building materials dusts and scatters, it may enter the human body to ruin people's health and invite deseases. Therefore, effective countermeasures have been expected.

To cope with the above-described problem, it has been conventional practice to carry out the following methods: ① a method wherein a vinyl acetate emulsion is sprayed on an existing asbestos-containing building material so as to cover the surface thereof; and ② a method wherein a water-soluble synthetic resin (e.g., acrylic resin) polymer compound is sprayed on and impregnated into an existing asbestos containing building material to confine asbestos dust.

However, the above-described prior art method ① that employs a vinyl acetate emulsion has the following problems. Although the surface of the asbestos containing building material is effectively covered with the vinyl acetate emulsion, the depth of penetration of the emulsion into the material is small so that separation may occur at the interface between the sprayed layer and a layer which is not impregnated with the emulsion. In addition, when the asbestos containing building material is demolished or repaired, asbestos which is contained inside the material may be scattered.

The prior art method ② that employs a water-soluble synthetic resin (e.g., acrylic resin) polymer compound suffers from the following problems. Since such a water-soluble polymer compound penetrates only to a depth of from 4 to 5 mm from the surface of the building material, even if the concentration is optimized, the effectiveness of preventing dusting of the building material is insufficient. Further, the material cost is high.

BRIEF DESCRIPTION OF THE DRAWINGS

FIG. 3 schematically shows one example in which a building material is impregnated with a polyvinyl alcohol or denatured polyvinyl alcohol aqueous solution using an impregnating apparatus.

SUMMARY OF THE INVENTION

Figure 1:
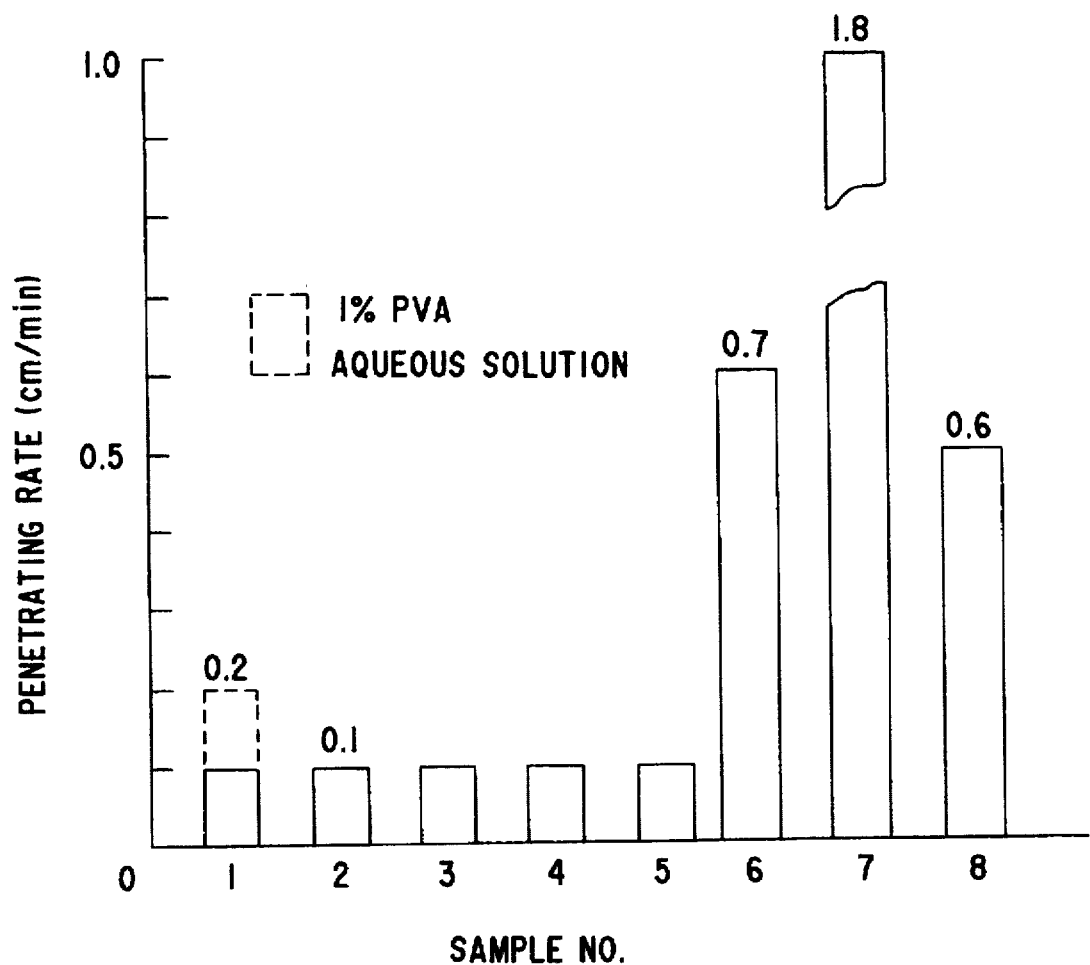
FIG. 1 is a graph showing the respective penetrabilities of polyvinyl alcohol aqueous solutions and various other solutions with respect to a sprayed-on asbestos containing material.

The present invention relates to an anti-dusting treating method for inorganic fiber containing building materials which comprises impregnating an inorganic fiber containing building material with an aqueous solution of either a polyvinyl alcohol or a denatured polyvinyl alcohol.

A typical example of inorganic fibers in the present invention is asbestos.

Impregnation of an inorganic fiber containing building material with an aqueous solution of either a polyvinyl alcohol or a denatured polyvinyl alcohol may be effected by coating, spraying or other similar means.

It is preferable to employ a polyvinyl alcohol having a polymerization degree of from 250 to 500, more preferably, from 300 to 350, and a saponification degree of from 80 to 98%, more preferably from 80 to 85%.

As to the polyvinyl alcohol aqueous solution, it is preferable to employ an aqueous solution containing 2 to 10% of a polyvinyl alcohol.

It is also preferable that the polyvinyl alcohol aqueous solution contain 0.01 to 0.1% of an anionic or nonionic surface active agent.

As to the denatured polyvinyl alcohol, it is preferable to employ a polyvinyl alcohol denatured with sulfonic acid or a derivative thereof or maleic acid or a derivative thereof.

The denatured polyvinyl alcohol employed in the present invention preferably has a polymerization degree of from 250 to 500, more preferably from 300 to 350.

The denatured polyvinyl alcohol aqueous solution preferably contains 2 to 30 parts by weight of a denatured polyvinyl alcohol with respect to 100 parts by weight of water.

It is further preferable that the denatured polyvinyl alcohol aqueous solution further contain 2 to 20 parts by weight of glycerin, 0.1 to 2 parts by weight of diammonium phosphate, 0.001 to 1 part by weight of sodium dehydroacetate, and 5 to 30 parts by weight of titanium oxide with respect to 100 parts by weight of water.

The present invention aims at preventing dusting of a building material containing an inorganic fiber such as asbestos by impregnating such an inorganic fiber containing building material with a polyvinyl alcohol or denatured polyvinyl alcohol aqueous solution. The polyvinyl alcohol or denatured polyvinyl alcohol employed in the present invention has excellent penetrating and film-forming properties, and the impregnated polyvinyl alcohol or denatured polyvinyl alcohol serves as an adhesive by which inorganic fibers such as asbestos fibers are fixed. Therefore, it is possible to facilitate the impregnating operation and obtain satisfactory anti-dusting effectiveness.

Further, it is possible to prevent scattering of harmful dust when the impregnated building material is demolished.

If a denatured polyvinyl alcohol aqueous solution having sodium dehydroacetate and diammonium phosphate added thereto as adjusting agents is employed, antiseptic properties are imparted to the impregnated building material, so that it can be preserved for a long period of time. In addition, it is possible to ensure superior fire retardancy.

DESCRIPTION OF THE PREFERRED EMBODIMENT

The present inventors made various studies in order to solve the above-described problems of the prior art and, as a result, have found that it is possible to prevent dusting of a building material containing an inorganic fiber such as asbestos with ease and at low cost by impregnating it with a polyvinyl alcohol (PVA) or denatured polyvinyl alcohol aqueous solution.

As a result of various experiments conducted by the present inventors with respect to a variety of water-soluble binders, it has been revealed that, when carboxymethylcellulose (CMC), sodium alginate or sodium polyacrylate is employed as an anti-dusting treating agent, such a substance reacts with cement in a building material containing an inorganic fiber such as asbestos to cause aggregation and precipitation and therefore it is difficult for the treating agent to exhibit its binder function, and polyethylene glycol (PEG) when used as an anti-dusting treating agent will not set, whereas, a polyvinyl alcohol has superior anti-dusting treating effectiveness as compared with other known materials.

More specifically, the polyvinyl alcohol or denatured polyvinyl alcohol according to the present invention can be applied directly to a building material in the form of an aqueous solution and is superior in terms of both penetrability into a building material such as an asbestos containing wall material and bonding properties as an adhesive. Accordingly, it is suitable for being used as an anti-dusting treating agent for inorganic fiber containing building materials.

Typical examples of inorganic fiber containing building materials according to the present invention include asbestos fiber containing building materials, e.g., asbestos containing concrete walls and fire-resisting coating materials. The present invention may also be applied to building materials that contain synthetic inorganic fibers such as rock wool.

As to the polyvinyl alcohols employed in the present invention, it is preferable to select one which has a relatively low polymerization degree, i.e., from 250 to 500, and a saponification degree of from 80 to 98% with a view to ensuring excellent penetrability.

Polyvinyl alcohols which have a polymerization degree of from 250 to 500 have an appropriately low viscosity, while those which have a saponification degree of from 80 to 98% have an appropriately low surface tension, and therefore these polyvinyl alcohols enable the resulting anti-dusting treating agents to maintain appropriate penetrability and hence are preferably employed to practice the method of the present invention.

The concentration of the polyvinyl alcohol aqueous solution is preferably set at 10% by weight or less, but it is also possible to allow the treating agent to penetrate into an inorganic fiber containing building material in a considerably excellent way by spraying an aqueous solution containing 2 wt. % or less of a polyvinyl alcohol a multiplicity of times.

It should be noted that it is possible to improve the wetting properties of the treating agent with respect to asbestos, rock wool or the like contained in a building material, enhance the penetrability and improve the adhesion between the inorganic fibers by adding 0.01 to 0.1% by weight of an anionic or nonionic surface active agent to the polyvinyl alcohol aqueous solution as a penetrating agent that promotes penetration into the building material.

Further, it is also preferable to add to the polyvinyl alcohol aqueous solution 5 to 10% by weight of a pigment, for example, titanium oxide fine powder, hydrous iron oxide or iron oxide red, which has strong hiding power, with a view to improving the coating effect on the surface of the building material.

It is also preferable to add to the polyvinyl alcohol aqueous solution 0.001 to 0.1% by weight of an antiseptic agent for preservation and a small amount of a perfume (lavender lemon, phyton cide, etc.).

Impregnation of the polyvinyl alcohol aqueous solution into an inorganic fiber containing building material may be effected by coating, spraying, dipping or other similar means. It is also possible to practice the impregnation effectively by the use of an apparatus having needle tubes, such as that shown in FIG. 3 (described later).

Examples of denaturants used to denature a polyvinyl alcohol employed in the present invention include inorganic acids, e.g., sulfonic acid and derivatives thereof. For example, p-toluenesulfonic acid can be employed.

It is also possible to employ polyvinyl alcohols which are denatured with organic acids such as carboxylic acids, e.g., succinic acid, adipic acid, maleic acid, fumaric acid, etc. It is particularly preferable to employ a polyvinyl alcohol which is denatured with maleic acid, which is an unsaturated carboxylic acid. It is also possible to use derivatives of these organic acids as denaturants.

In the case of polyvinyl alcohols denatured with the above-described inorganic acids, e.g., polyvinyl alcohols denatured with sulfonic acid, a denatured polyvinyl alcohol in which about 20% of polyvinyl alcohol is denatured with sulfonic acid is superior in terms of both the depth of penetration into an inorganic fiber containing building material and film-forming properties.

The denatured polyvinyl alcohol that is employed in the present invention is superior to a polyvinyl alcohol in terms of penetrability into a building material containing an inorganic fiber such as asbestos. The polymerization degree of the denatured polyvinyl alcohol is preferably 500 or less from the viewpoint of penetrability and film-forming properties.

However, when the thickness of an asbestos containing building material is 30 mm or less, a polyvinyl alcohol (polymerization degree: 4000 to 250; saponification degree: 75 to 100%) may be added to a denatured polyvinyl alcohol in the weight ratio 0.1 to 9:1.

The concentration of a denatured polyvinyl alcohol in an aqueous solution which is to be impregnated into a building material by spraying or the like is preferably 2 to 30 parts by weight with respect to 100 parts by weight of water. If the denatured polyvinyl alcohol concentration is less than 2 parts by weight, asbestos dust cannot be effectively confined, whereas, if said concentration exceeds 30 parts by weight, solubility becomes inferior. A particularly preferable concentration is about 20 parts by weight.

It is preferable to add other adjusting agents to the denatured polyvinyl alcohol aqueous solution according to the present invention.

Examples of adjusting agents which may be added to the aqueous solution are glycerin, diammonium phosphate, sodium dehydroacetate, titanium oxide and calcium carbonate.

Glycerin is employed to impart flexibility to the film of polyvinyl alcohol. It is preferable to add 2 to 20 parts by weight of glycerin with respect to 100 parts by weight of water.

If the glycerin concentration exceeds 20 parts by weight, the strength of the denatured polyvinyl alcohol as a binder is impaired, whereas, if the glycerin concentration is less than 2 parts by weight, the impregnated building material becomes excessively rigid and brittle and is inferior in terms of impact resistance. A particularly preferable glycerin concentration is about 4 parts by weight.

Diammonium phosphate acts as a fire retardant. It is preferable to add 0.1 to 2 parts by weight of diammonium phosphate with respect to 100 parts by weight of water. Although it is possible to employ a phosphate ester as a fire retardant, diammonium phosphate is more advantageous from the viewpoint of cost.

Sodium dehydroacetate is employed as an antiseptic agent. Addition of 0.001 to 1 part by weight of sodium dehydroacetate makes it possible to prevent putrefaction of the denatured polyvinyl alcohol. A sodium dehydroacetate concentration less than 0.001 part by weight produces no antiseptic effect, whereas a sodium dehydroacetate concentration in excess of 1 part by weight impairs the penetrability of the treating agent.

Titanium oxide acts so as to color (white) the building material and also increase the surface hardness after spraying.

A titanium oxide concentration less than 5 parts by weight provides no coloring function, whereas, a titanium oxide concentration in excess of 30 parts by weight impairs the penetrability of the treating agent.

Accordingly, it is preferable to add 5 to 30 parts by weight of titanium oxide. A particularly preferable titanium concentration is about 10 parts by weight.

Table 1 below shows the above-described materials and compounding ratios.

TABLE 1

| Materials | Compounding ratios (parts by weight) |
| --- | --- |
| Denatured polyvinyl alcohol | 2 to 30 |
| Glycerin | 2 to 20 |
| Diammonium phosphate | 0.1 to 2 |
| Sodium dehydroacetate | 0.001 to 1 |
| Titanium oxide | 5 to 30 |
| Water | 100 |

The following is a description of the results of a comparative test conducted to clarify the superiority of the denatured polyvinyl alcohol aqueous solution according to the present invention.

The penetrabilities and film-forming properties of various polyvinyl alcohol aqueous solutions (each containing 10% of titanium oxide and 10% of a binder), sodium polyacrylate aqueous solutions (commercially available treating agents for preventing dusting of asbestos) and water were measured using a sprayed-on asbestos containing material of 300 mm×300 mm×30 mm.

The penetrability was measured by dipping one end portion of the above-described sprayed-on asbestos containing material in each sample impregnating solution and measuring the distance through which the sample solution rises per predetermined period of time.

Evaluation of film-forming properties was made by observation of the external appearance of the impregnated sprayed-on asbestos containing material and touching the same.

Figure 2:
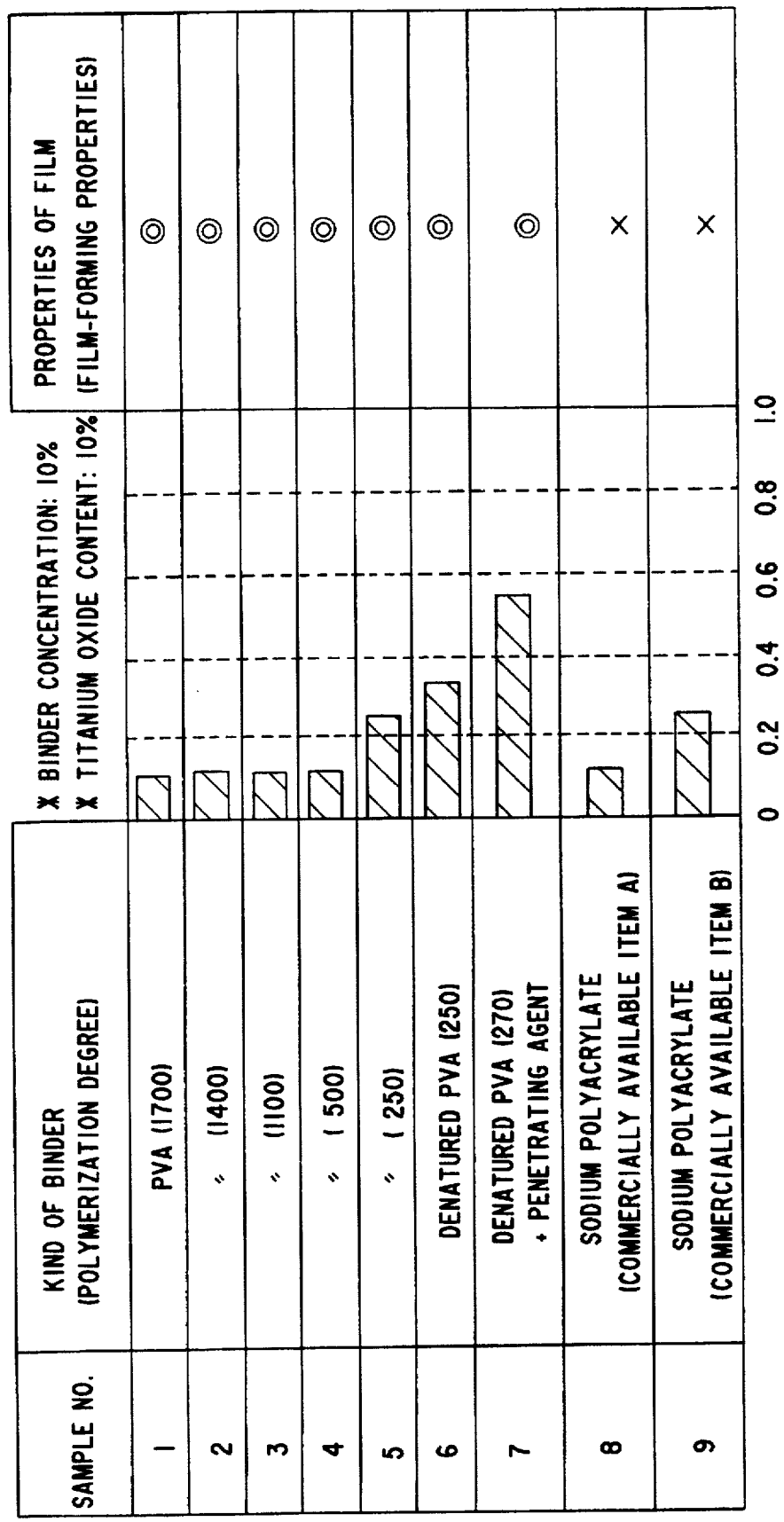
FIG. 2 is a chart showing the penetrabilities and film-forming properties of various anti-dusting treating agents.

The results of the comparative test are shown in FIG. 2. As will be clear from the figure, the respective penetrating rates of the aqueous solutions containing 10% of a polyvinyl alcohol are about 0.1 cm/min substantially irrespective of the polymerization degree and the saponification degree. Even an aqueous solution having a low polyvinyl alcohol concentration, i.e., 1%, shows a penetrating rate of about 0.2 cm/min.

On the other hand, the aqueous solution containing 10% of a denatured polyvinyl alcohol ["Gohsenol L-3266" (trade name) of The Nippon Synthetic Chemical Industrial Co., Ltd.], i.e., Sample No. 6, exhibits a penetrating rate of about 0.35 cm/min, which is 3 times or more that in the case of the PVA aqueous solutions. The penetrating rate of an aqueous solution further containing 1.5% of a penetrating agent ["Dapro W-77" (trade name) of San Nopco Ltd.], i.e., Sample No. 7, is markedly high, i.e., 0.58 cm/min. It should be noted that all the PVA and natured PVA aqueous solutions had excellent film-forming properties.

In contrast, the treating agents (Sample Nos. 8 and 9) respectively employing commercially available sodium polyacrylates show somewhat excellent penetrating rates but lack film-forming properties and therefore become powdery. Thus, Sample Nos. 8 and 9 are defective treating agents.

Next, the sprayed-on asbestos containing material was sufficiently impregnated with each of sample Nos. 1 to 7, that is, a polyvinyl alcohol or denatured polyvinyl alcohol aqueous solution. After drying, each impregnated material was crushed with a hammer. As a result, there was no scattering of asbestos and it was confirmed that the treating agents according to the present invention had satisfactory anti-dusting effectiveness.

The method of the present invention is principally practiced for the purpose of confining dust of inorganic fibers such as asbestos within building materials and preventing dusting of such inorganic fibers during an operation of demolishing and removing a building, and the method may be carried out by, for example, coating, dipping or spraying an inorganic fiber containing material with a denatured polyvinyl alcohol aqueous solution. It is also possible to carry out the impregnation effectively by the use of an apparatus having needle tubes 2, such as that shown in FIG. 3.

FIG. 3 shows one example in which a sprayed-on asbestos containing material is impregnated with a denatured polyvinyl alcohol aqueous solution. As illustrated, a denatured polyvinyl alcohol aqueous solution is supplied by means of a pump 4 from the proximal end portion of a pipe 1 provided with a plurality of needle tubes 2 to thereby inject the denatured polyvinyl alcohol aqueous solution from orifices 3 provided in the needle tubes 2 which are stuck into the sprayed-on asbestos containing material 5.

It should be noted that the needle tubes 2 are connected to the pipe 1 such that the bores in the tubes 2 are communicated with the inside of the pipe 1.

In this case, each needle tube 2 has a multiplicity of orifices 3 provided in the peripheral wall thereof, and the denatured polyvinyl alcohol aqueous solution is directly supplied deep into the sprayed-on asbestos containing material 5. Accordingly, the impregnating operation can be satisfactorily effected within a short period of time.

Examples of the present invention will next be explained.

EXAMPLE 1

The respective penetrabilities of PVA aqueous solutions having various PVA concentrations, water and aqueous solution containing a surface active agent, etc. shown in Table 2 were measured using sprayed-on asbestos containing material of 300 mm×300 mm×30 mm. The measurement was carried out by dipping one end portion of the above-described sprayed-on asbestos containing material in each sample impregnating solution and measuring the distance through which the sample solution rises per predetermined period of time.

TABLE 2

| No. | Sample impregnating solutions |
| --- | --- |
| 1 | Aqueous solution containing 10% of PVA having a polymerization degree of 500 and a saponification degree of 80% |
| 2 | Aqueous solution containing 10% of PVA having a polymerization degree of 500 and a saponification degree of 100% |
| 3 | Aqueous solution containing 10% of PVA having a polymerization degree of 1100 and a saponification degree of 85% |
| 4 | Aqueous solution containing 10% of PVA having a polymerization degree of 1400 and a saponification degree of 100% |
| 5 | Aqueous solution containing 10% of PVA having a polymerization degree of 1700 and a saponification degree of 100% |
| 6 | Water |
| 7 | Aqueous solution containing 0.1% of detergent |
| 8 | Aqueous solution containing 1% of PVA having a polymerization degree of 500 and a saponification degree of 80%, 0.05% of Nopco wet 50 (surface active agent) and 5% of $TiO_2$. |

The results of the measurement are shown in FIG. 1. As will be clear from the figure, the respective penetrating rates of the aqueous solutions containing 10% of PVA are about 0.1 cm/min substantially irrespective of the polymerization degree and the saponification degree.

Even an aqueous solution having a low PVA concentration, i.e., 1%, shows a penetrating rate of about 0.2 cm/min.

On the other hand, the penetrating rate of the PVA aqueous solution containing a surface active agent, i.e., Sample No. 8, is 0.6 cm/min, which is excellent and substantially equal to that of water.

It has also been revealed that addition of about 3% of ethyl alcohol further improves the penetrability.

Next, the sprayed-on asbestos containing material was sufficiently impregnated with each of Sample Nos. 1 to 5 and 8, that is, a PVA aqueous solution. After drying, each impregnated material was crushed with a hammer. As a result, there was no scattering of asbestos and it was confirmed that the treating agents according to the present invention had satisfactory anti-dusting effectiveness.

FIG. 3 shows one example in which a sprayed-on asbestos containing material is impregnated with a polyvinyl alcohol aqueous solution by means of an improved apparatus. As illustrated, a polyvinyl alcohol aqueous solution is supplied by means of a pump 4 from the proximal end portion of a pipe 1 provided with a plurality of needle tubes 2 to thereby inject the polyvinyl alcohol aqueous solution from orifices 3 provided in the needle tubes 2 which are stuck into the sprayed-on asbestos containing material 5. It should be noted that the needle tubes 2 are connected to the pipe 1 such that the bores in the tubes 2 are communicated with the inside of the pipe 1.

Each needle tube 2 has a multiplicity of orifices 3 provided in the peripheral wall thereof, and the polyvinyl alcohol aqueous solution is directly supplied deep into the sprayed-on asbestos containing material 5. Accordingly, the impregnating operation can be satisfactorily effected within a short period of time.

EXAMPLE 2

First, an anti-dusting treating agent having the following composition was prepared.

|  | (parts by weight) |
| --- | --- |
| Denatured polyvinyl alcohol (Gohsenol L-3266 of The Nippon Synthetic Chemical Industrial Co., Ltd.) | 20 |
| Titanium oxide | 10 |
| Penetrating agent (Dapro W-77 of San Nopco Ltd.) | 2 |
| Water (ion-exchanged water) | 100 |

The following various anti-dusting treatments were carried out by the use of the above-described anti-dusting treating agent. A building material as an object of treatment was a sprayed-on asbestos containing material layer (asbestos content: 60%; density: 0.3; area: 100×100 cm; and thickness: 6 cm) laminated on the concrete wall surface.

① Confinement of asbestos dust by impregnation:

The above-described building material as an object of treatment was impregnated with a solution prepared by diluting the above-described treating agent twice by the use of the same apparatus (shown in FIG. 3) as that used in Example 1.

Impregnation was carried out under the conditions that the depth of penetration of the needle tubes 2 was 5.5 cm and the rate of injection was 3.7 l/m².

Thereafter, the surface of the object was finished using the stock solution.

② Prevention of scattering of asbestos at the time of demolishing and removing the building material by spraying:

The building material as an object of treatment was sprayed with a solution prepared by diluting the above-described treating agent 8 times by the use of an airless spray gun ["Diaphragm Airless" (trade name) of Iwata Air Compressor MFG., Co., Ltd.]. Thereafter, the building material was demolished and then an asbestos removing operation was conducted.

③ Surface treatment by spraying:

The above-described anti-dusting treating agent was sprayed on the building material as an object of treatment by the use of an airless spray gun.

This treatment is carried out for the purpose of considerably increasing the surface hardness and thereby improving the resistance to impact applied by an object that comes flying, such as a ball.

The followings are the results of the above-described treatments:

In the case of ①, all the asbestos fibers were tied together.

The rate of scattering of asbestos was substantially equal to that in the case of the outside, i.e., 0.02 f/l.

In the case of ②, the treating agent penetrated into all of the asbestos and prevented scattering of dust at the time of removal of the asbestos.

In the case of ③, the surface heardness was increased to such an extent that the impact of a ball caused no damage.

What we claim is:

1. A method for demolishing a portion of a building which includes building materials containing asbestos so as to reduce the dusting characteristics of the building materials, the method comprising spraying the building materials containing asbestos with a solution of polyvinyl alcohol so as to impregnate the building materials with the solution, and then demolishing the portion of the building.

2. A method according to claim 1 wherein the polyvinyl alcohol is a denatured aqueous solution.

3. A method according to claim 1, wherein the polyvinyl alcohol has a polymerization degree of from 250 to 500 and a saponification degree of from 80 to 98%.

4. A method according to claim 1, wherein the polyvinyl alcohol solution is an aqueous solution containing 2 to 10% of a polyvinyl alcohol.

5. A method according to claim 4, wherein the polyvinyl alcohol solution contains 0.01 to 0.1% of an anionic or nonionic surface active agent.

6. A method according to claim 2, wherein the denatured polyvinyl alcohol is a polyvinyl alcohol denatured with sulfonic acid or a derivative thereof.

7. A method according to claim 2, wherein the denatured polyvinyl alcohol is a polyvinyl alcohol denatured with maleic acid or a derivative thereof.

8. A method according to claim 2, wherein the denatured polyvinyl alcohol has a polymerization degree of from 250 to 500.

9. A method according to claim 2, wherein the denatured polyvinyl alcohol aqueous solution contains 20 to 30 parts by weight of a denatured polyvinyl alcohol with respect to 100 parts by weight of water.

10. A method according to claim 2, wherein the denatured polyvinyl alcohol aqueous solution contains 2 to 20 parts by weight of glycerin, 0.1 to 2 parts by weight of diammonium phosphate, 0.001 to 1 part by weight of sodium dehydroacetate, and 5 to 30 parts by weight of titanium oxide with respect to 100 parts by weight of water.

11. A method according to claim 1, further including removing the building materials containing asbestos after demolition of the building.

* * * * *